Dec. 10, 1968  C. J. KOESTER ET AL  3,416,089
LASER AMPLIFIER CONSTRUCTION

Filed April 3, 1964  2 Sheets-Sheet 2

INVENTORS
CHARLES J. KOESTER
NOBLE S. WILLIAMS
BY
ATTORNEY 3,416,089
LASER AMPLIFIER CONSTRUCTION
Charles J. Koester, South Woodstock, Conn., and Noble S. Williams, Sturbridge, Mass., assignors, by mesne assignments, to American Optical Company, Southbridge, Mass., a corporation of Delaware
Filed Apr. 3, 1964, Ser. No. 357,194
13 Claims. (Cl. 330—4.3)

This invention relates to laser amplifiers and the like, and more particularly to laser amplifier constructions and devices which include means for enabling high gain in the optical signals being amplified thereby while preventing undesired laser oscillation from occurring.

It has already been proposed to provide a laser amplifier construction in the form of a relatively thin elongated member comprising a central core of transparent laser material of a given refractive index surrounded by a suitable transparent cladding of material of lower refractive index and selected and controlled in such a way that not only may optical pumping energy be readily transmitted through the cladding material and into all parts of the laser material forming the core for absorption and effecting an inversion of population thereof but, at the same time, the refractive index difference between the core and cladding was so related that undesired spontaneous laser emission was, to a large degree, eliminated while stimulated laser emission in the longitudinal direction of the core was enhanced, thereby enabling a higher gain in amplification of the optical signals travelling therethrough to be obtained.

It has now been found that when such a relatively thin elongated laser amplifier device is provided at one end, or at both ends, with an improved end construction of the type presently to be described, an appreciable increase in laser signal amplification can be effected without producing laser oscillation, and with this increase or gain in amplification being in the order of many fold that provided heretofore by laser amplifier devices of earlier construction. In fact, the improved laser amplifier construction is such that internal surface reflections, which ordinarily occurred at the end surfaces of the elongated laser amplifier core and which have been found to reduce signal amplification, can now be nearly completely eliminated and, accordingly, greater signal amplification obtained.

This signal amplification is now accomplished mainly by a structural arrangement which substantially eliminates any appreciable optical interfacial conditions at the end, or ends, of the laser amplifier core. Instead, an end surface, acting as the exit surface of the laser device, or acting as the entrance surface thereof, or as both, can be provided by an end extension formed of a transparent material having substantially the same refractive index as that of the laser core and arranged in integral relation therewith, and this end extension is made of such a longitudinal dimension relative to the transverse dimensions of the laser core and cladding as to position the end surface thereof which is to act as the entrance surface or the exit surface for the amplifier device at a material distance from the end of the laser core. Also, the end extension is made of such transverse dimensions as to provide adequate room within the extension for divergent optical energy emitted from the laser core to spread out appreciably before striking the said end surface. Thus, the unit intensity of this diverging energy is materially reduced by the time it reaches the end surface. Also, since internal reflection of a part of this energy at the end surface will occur, the transverse dimensions of this extension are purposely made of sufficient size to allow even a greater spreading of this divergent energy after reflection and before being absorbed by other means forming part of the structural arrangement.

Additionally, the end surface of this extension is intentionally arranged at such an angle relative to the longitudinal direction of the laser core integrally secured thereto that a material part of the laser energy travelling substantially parallel thereto will be, after impinging upon a small central area of this end surface, internally reflected but in such a direction as not to re-enter the laser core. Thus, depopulation due to this energy will be avoided.

The structural arrangement, as suggested above, is also provided with light-absorbing means arranged between the transparent cladding material of the laser member and the already-mentioned transparent extension carrying the angled reflecting end surface so that not only is most of the optical energy which might be travelling as stray light within the cladding material absorbed by this light-absorbing means but also most of the light internally reflected from the end surface of the extension will also be absorbed by this light-absorbing means. It is even possible to treat the end surface of said extension with a reflection reduction coating in an endeavor to reduce the amount of light internally reflected at this surface.

Additionally, if desired, a heat sink, formed of a suitable means, such as metal of good conductivity and including a fluid medium which may be circulated therethrough, may be arranged in surrounding contacting relation with the light-absorbing means in such a manner as to enable heat generated at such locations to be readily absorbed and conducted away from the laser amplifier device.

Preferably, the laser core, the cladding, transparent end extension and the light-absorbing means will be formed of glasses and fused together to form an integral construction.

It is, accordingly, a principal object of the present invention to provide a laser amplifier construction or device comprising a relatively thin elongated member having a central core of transparent laser material, preferably a laser glass, of a predetermined refractive index surrounded by a cladding of suitable transparent material, preferably a glass, of a lesser refractive index and with one, or both ends, of this member being provided with an improved structural arrangement in the form of an end extension formed of transparent material, preferably of glass, of substantially the same refractive index as that of the laser core and arranged in integral relation with an end wall or surface thereof so as to essentially remove all interfacial conditions or effects, such as reflection, therebetween, and with said end extension being of material length and of such greater transverse dimensions than the core and cladding as to allow appreciable spreading out of any of the optical energy, which is travelling within the core at various angles of propagation relative to the axis thereof, when emitted from the end of said laser core and by the time it impinges upon the end surface of the extension.

It is also an object of the invention to arrange the end wall of the extension at such an angle that that portion of the amplified laser signal energy which is internally reflected by this end wall or surface back into the end extension will be directed along such paths as not to re-enter the laser core.

It is also an object of the invention to provide for such an improved laser amplifier construction light-absorbing means, which is preferably formed of glass and which is disposed therein in such a way as to absorb not only any stray light which may be travelling in the cladding material but also disposed so as to absorb most of the internally reflected light mentioned above.

It is additionally an object of the invention to provide in conjunction with such a laser device or construction and light-absorbing means a heat sink of such a character as to enable heat generated during operation of the laser amplifier to be efficiently absorbed and removed from the laser amplifier device.

Other objects and advantages of the present invention will become apparent from the detailed description which follows when taken in conjunction with the accompanying drawing in which.

Figure 1:
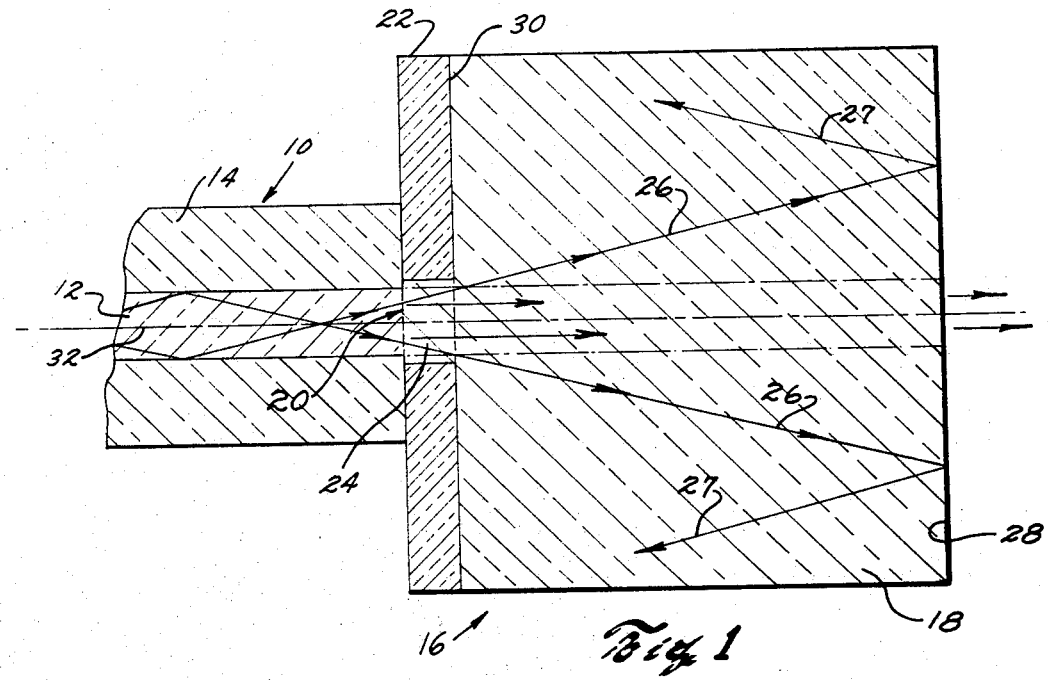
FIG. 1 is a longitudinal sectional view of a laser amplifier construction embodying the present invention.

Referring to the drawing in detail and in particular FIG. 1, it will be seen that one end portion of an elongated laser amplifier member or component is indicated at 10 and this member or component comprises a central core 12 formed of a clear transparent laser material, preferably of a laser glass, such as a neodymium-doped barium crown glass, which has a suitable predetermined refractive index and is surrounded by a transparent cladding 14 of transparent material of a lesser refractive index, preferably of glass, such as soda-lime glass, which is disposed in surrounding and integral optical contact with the side wall portions of said core. Adjacent one end or, if desired, adjacent both ends of such an elongated laser component is provided an end extension or assembly 16 in the form of a relatively large block 18 of transparent material, preferably of glass, of substantially the same physical characteristics and the same refractive index as that of the elongated laser core 12.

This block or extension 18 is formed in integral relation with the material forming the core 12 so that substantially no interfacial condition will exist at the location or junction indicated by dotted line 20 therebetween. For reasons presently to be explained, the block or extension 18 is arranged to have an appreciable longitudinal dimension and appreciable transverse dimensions when compared to the diameter of the core 12. The assembly also includes an intermediate member 22 more or less in the form of a washer and formed of an optically opaque material, such as black glass, disposed between the main part of the block 18 and the cladding 14 and surrounding the small central projecting part 24 of the block which is arranged in integrally fused relation with the core 12. Preferably, the glasses or other materials forming the core, the cladding, the transparent block or extension, and the opaque washer will have nearly the same coefficients of thermal expansion so that, during laser use of the device, no failure of the structure due to thermal expansion or contraction will occur.

It has been found that optical signal amplification by laser amplifier constructions of earlier forms has been limited, due to the oscillation which occurs when the amplification reaches a so-called threshold value for the construction being considered. Threshold is reached when the amplification per pass of energy within the laser element times the feedback thereof equals or exceeds unity. The feedback in the present instance is precisely that fraction of the energy incident on the end surface of the laser core 12, or any extension thereof, which is reflected back into the laser core. For a typical air-to-glass interface, the energy loss is approximately 4%. Thus, the amplification per pass has an upper limit of 25. In order to increase the amplification, the feedback must be reduced. This will allow a greater inversion to be built up without oscillation, and this greater inversion, in turn, leads to greater amplification.

It has now been found that by forming the block or end extension 18 of transparent material of substantially the same refractive index as that of the core 12 and by integrally fusing or attaching these parts together, as at dotted line 20, the effects of an optical interface therebetween can be substantially completely eliminated. The advantageous result to be thus obtained is that substantially no light at this location will be reflected back into the laser core 12 so as to tend to lessen the signal amplification being provided thereby.

Also by the use of a relatively large block of transparent material, the extension 18 can be provided with a sufficient length and with sufficient transverse dimensions so as to allow light rays, such as indicated at 26, after travelling in the core 12 as other than lower order modes to spread out while travelling through the block 18 to the end surface 28 thereof. Accordingly, when such rays are reflected at the end wall 28 as suggested by arrows 27, they will continue to diverge and the relative intensity of the optical energy will be materially reduced by the time they reach the inner end surface 30 of the block 18. At this location, most of this stray light will be absorbed by the light-absorbing layer 22 preferably of nearly the same refractive index as that of the extension 18. It follows, therefore, that should any of these reflected rays succeed in re-entering the laser core 12, they will contain a far lesser amount of optical energy than they would have contained if they had been reflected back by the end surface of the laser core when no such end extension is present.

Figure 2:
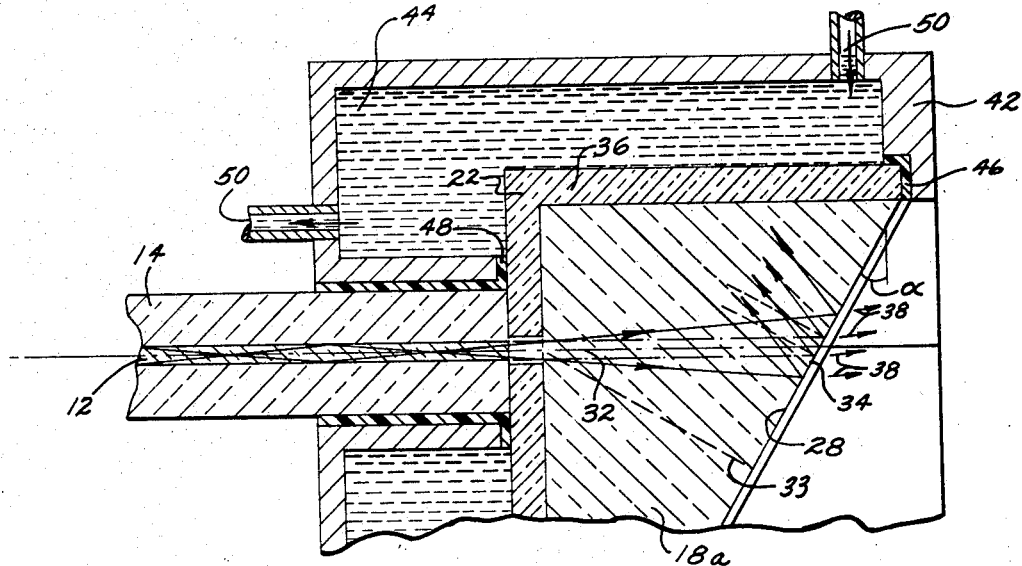
FIG. 2 is a longitudinal sectional view somewhat like that of FIG. 1 but showing a modification thereof.

It is also possible, as suggested by angle α in FIG. 2, to arrange the flat end surface 28a of the extension 18a so as to be at a sufficient angle relative to the optical axis 32 of the laser core 12, so that all of the laser light which is incident upon the end surface 28a and is internally reflected by this end surface will be directed along paths which will not allow this reflected energy to re-enter the laser core. This will be so when the angle α is so chosen that all of the rays emitted from the end of the laser core impinge upon the surface 28a sufficiently to one side of the dotted line 33; line 33, of course, being drawn normal to the surface 28a and intersecting axis 32 substantially at the emitting end of the core.

Instead, this reflected optical energy will be absorbed by the opaque washer-like layer 22 or by an opaque peripherally arranged layer or collar 36, preferably formed of black glass, arranged in encircling relation to the side wall portions of the transparent block 18. (The emitted amplified laser beam is indicated by arrows 38 and would be slightly refracted as same passes from the block 18 into the air or other surrounding medium.)

Figure 3:
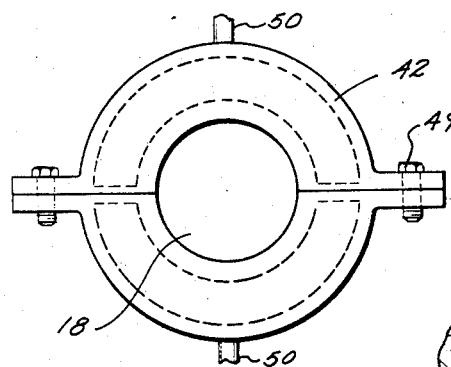
FIG. 3 is an end view of the structure shown in FIG. 2.

Also indicated in FIG. 2 in surrounding relation to the light-absorbing collar 36 and layer 22 is a heat sink which may be formed by a metallic jacket 42 arranged to form a chamber and enclose a suitable liquid coolant 44; this jacket being, as shown in FIG. 3, divided into two halves for ease of assembly and adapted to be clamped together and about the end extension 18 by known means 49. Flexible gaskets are indicated at 46 and 48 between the jacket and the extension 18 and conduits for circulating the coolant are indicated at 50. In this manner, each laser amplifier end construction can be maintained within safe operating temperatures.

Figure 4:
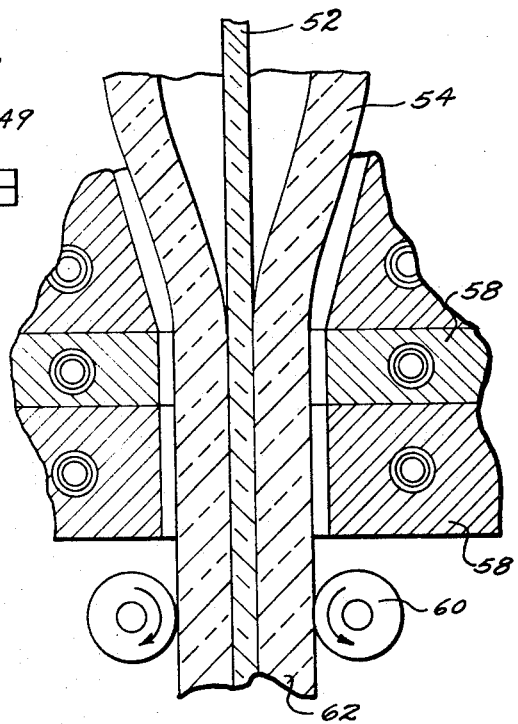
FIG. 4 is a longitudinal sectional view of heating and drawing apparatus being used in the formation of a part of the laser construction embodying the present invention.
Figure 5:
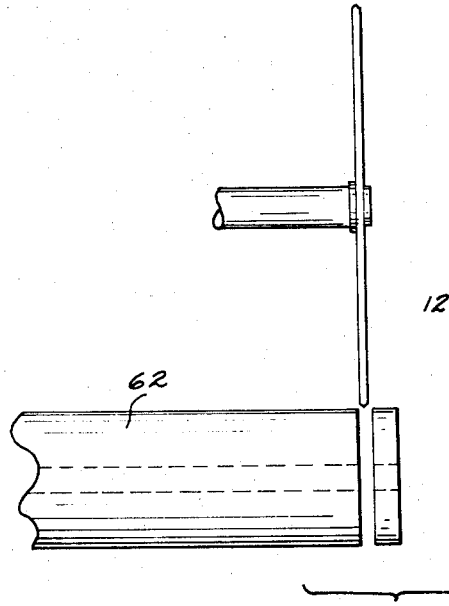
FIG. 5 is additional apparatus employed in the manufacture of laser amplifier construction of the present invention.

It would be possible in the manufacture of laser amplifier components including the end extension 18 in integral relation therewith, to first form washer-like elements by providing, as suggested in FIG. 4, a rod 52 of clear transparent glass of substantially the same refractive index as that of the laser core material and a tube 54 of opaque glass of a slightly larger inside diameter. These members are then arranged in concentric relation and simultaneously drawn down to approximate size in known manner while being heated to a suitable temperature in an electrically heated ring-type furnace 58 and equipped with suitably controllable power rollers or the like 60, so as to form the composite rod 62 of desired size. Thereafter, this composite rod would be cut off into washer-like members by a cut-off wheel or the like, as indicated in FIG. 5, and thereafter each washer-like member would be carefully ground and polished on its opposite faces so as to form said washer-like members 64, each having, as shown in cross-section, an outer ring-like part 66 formed of opaque glass and a central part 68 formed of clear glass in fused relation to each other.

Thereafter, an end of the laser member 10 comprising core 12 and cladding 14, one of the washer-like members 64 comprising the ring part 66 and the clear central part 68 and a transparent block like that suggested at 18 in FIG. 1 or 2 (all preferably formed of glass) would be arranged in aligned relation with each other within a suitable confining jig and heated to a fusing temperature. In this manner, a unitary structure free from interfaces of any significant character either between the core 12 and central part 68 or between the central part 68 and the large block 18 will be avoided.

Figure 6:
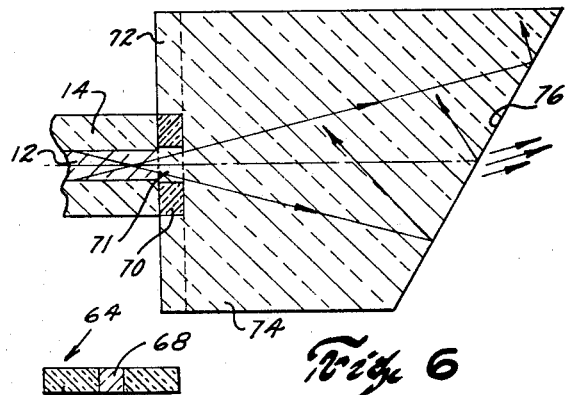
FIG. 6 is a longitudinal sectional view showing another modified construction.

Even though the absorbing portions of the washers 22, as shown in FIGS. 1 and 2, extend laterally appreciably beyond the limits of the cladding 14, it would be possible and with good advantage to provide an arrangement in which such absorbing material is of a more limited transverse size. This is indicated in FIG. 6 wherein an absorbing washer portion 70, which has a clear center 71, extends laterally only sufficiently to substantially fully block off optical energy at the adjacent end of the cladding 14. However, the full width and length desired for the end extension can, nevertheless, be easily provided by an outer transparent concentric cylindrical portion 72 formed of a transparent material of substantially the same refractive index as that of the center portion 71.

The concentric parts 70, 71 and 72 can be readily formed into a unitary disc-like member by the drawing down to size of the composite rod 62 together with an outer clear tubing, much like that already suggested relative to FIG. 4, and thereafter slicing off composite discs from the end thereof. These, of course, would then be ground and polished. Then such a disc will be fused or otherwise integrally secured on one side to the core and cladding and on the other side to block 74, all properly aligned, by use of a surrounding jig and preferably heat, as mentioned previously relative to FIG. 1. Such an outer clear tubing surrounding the component rod or fiber 62 facilitates handling thereof during fabrication, particularly in cases wherein same are of small diameters. This modified arrangement of FIG. 6 could be surrounded by a heat sink much like that shown in FIG. 2 and, since in such a case the energy internally reflected at the sloping surface 76 will pass directly into the circulating liquid coolant within the sink, the assembly may be easily maintained at a desired operating temperature.

While different glasses have already been mentioned as the preferred materials for forming both the elongated laser member and the end extension, it is also possible to form these parts of known kinds of plastics which likewise have the advantages of being readily moldable. Furthermore, in a manner similar to that described above for the glass parts, the plastic parts will be heat-fused, or bonded, or otherwise fixedly secured together so as to remove as much as possible all effects of any optical interfaces between the core and the extension.

We claim:

1. A laser amplifier construction for use in providing a high gain to optical signals being transmitted therethrough, said construction comprising a relatively thin elongated member having an elongated core formed of a laser material having a predetermined refractive index and including an active laser ingredient therein, and a cladding of transparent material of a lesser refractive index disposed in surrounding contacting relation with side wall portions of said elongated core, and an end extension disposed adjacent an end of said member, said extension comprising a transparent central part, an opaque part in surrounding relation to said central part, and a transparent block of appreciable length and width disposed adjacent thereto, said central part having at least as great a transverse dimension as that of said core and being aligned therewith, and said opaque part having a transverse dimension at least as great as that of said cladding, said central part and said transparent block being formed of a material of substantially the same refractive index as that of said core, and being secured together and to said core in such a manner as to remove at least to a high degree the effects of any optical interface therebetween, said transparent block being of an appreciable dimension considered in the longitudinal direction thereof so as to allow optical energy which is travelling in directions other than substantially parallel to the longitudinal direction of said core to diverge upon being emitted from the end of said core and before impinging upon an end wall of said block, and said block being of such transverse dimensions as to allow any of such divergent optical energy which is internally reflected at said end wall to spread out an even greater amount before impinging upon and being absorbed by said opaque part.

2. The combination defined in claim 1 and in which the materials forming said core, said cladding, said first part, said second part and said block are glasses and are integrally fused together to form a unitary structure.

3. The combination defined in claim 1 and including a heat sink in surrounding contacting relation with said opaque part so as to absorb heat therefrom.

4. A laser amplifier construction for use in providing a high gain to optical signals being transmitted therethrough, said construction comprising a relatively thin elongated member having an elongated core formed of a laser material having a predetermined refractive index and including an active laser ingredient therein, and a cladding of transparent material of a lesser refractive index disposed in surrounding contacting relation with side wall portions of said elongated core, and an end extension disposed adjacent an end of said member, said extension comprising a transparent central part, an opaque light-absorbing part in surrounding relation to said central part, and a transparent block of appreciable length and width disposed adjacent thereto, said central part having at least as great a transverse dimension as that of said core and being aligned therewith, and said opaque part having a transverse dimension at least as great as that of said cladding, said central part and said transparent block being formed of a material of substantially the same refractive index as that of said core, and being secured together and to said core in such a manner as to remove at least to a high degree the effects of any optical interface therebetween, said transparent block being of an appreciable dimension considered in the longitudinal direction thereof so as to allow optical energy which is travelling in directions other than substantially parallel to the axis of said core to diverge upon being emitted from the end of said core and before impinging upon an end wall of said block, and said block being of such transverse dimensions as to allow any of such divergent optical energy which is internally reflected at said end wall to spread out an even greater amount before impinging upon and being absorbed by said light-absorbing parts, and said end wall being so angularly disposed relative to the optical axis of said core as to re-direct any optical energy which is travelling in said block toward said end wall and substantially parallel to said axis and is internally reflected by said end wall back toward a part of said light-absorbing material spaced from said core.

5. The combination defined in claim 4 and in which the materials forming said core, said cladding, said first part, said second part and said block are glasses and are integrally fused together to form a unitary structure.

6. A laser amplifier construction for use in providing a high gain to optical signals being transmitted therethrough, said construction comprising a relatively thin elongated member having an elongated core formed of a laser material having a predetermined refractive index and including an active laser ingredient therein, and a cladding of transparent material of a lesser refractive index disposed in surrounding contacting relation with side wall portions of said elongated core, and an end extension disposed adjacent an end of said member, said extension comprising a transparent central part, an opaque light-absorbing part in surrounding relation to said central part, and a transparent block of appreciable length and width disposed adjacent thereto, said central part having at least as great a tranverse dimension as that of said core and being aligned therewith, and said opaque part having a transverse dimension at least as great as that of said cladding, said central part and said transparent block being formed of a material of substantially the same refractive index as that of said core, and being secured together and to said core in such a manner as to remove at least to a high degree the effects of any optical interface therebetween, said transparent block being of an appreciable dimension considered in the longitudinal direction thereof so as to allow optical energy which is travelling in directions other than substantially parallel to the axis of said core to diverge upon being emitted from the end of said core and before impinging upon an end wall of said block, a collar of light-absorbing material surrounding and contacting the side wall portions of said block, said block being of such transverse dimensions as to allow any of such divergent optical energy which is internally reflected at said end wall to spread out an even greater amount before impinging upon and being absorbed by said light-absorbing material and said end wall being so angularly disposed relative to the optical axis of said core as to re-direct any optical energy which is travelling in said block toward said end wall and substantially parallel to said axis and is internally reflected by said end wall back toward a part of said light-absorbing material spaced from said core.

7. The combination defined in claim 6 and including a heat sink in surrounding contacting relation with said light-absorbing material and arranged to absorb and conduct heat therefrom.

8. A laser amplifier device comprising a relatively thin elongated member having an elongated optical signal conducting core formed of a laser material having a predetermined refractive index and a cladding formed of a transparent material of a lesser refractive index in surrounding contacting relation with side wall portions of said core, transparent means formed of a material having substantially the same refractive index as said core and comprising a first smaller part in intimate optical contact with an end surface of said core and a second larger part in intimate optical contact with said first part, and both parts being in optical alignment with said core, said larger part being of appreciable length and width compared to the diameter of said core and having an optically finished exit surface formed thereon in materially spaced optical alignment with said core, and light-absorbing means disposed in surrounding relation to said first part and located between said cladding and said second part so as to serve as means for preventing the passage of optical energy from said cladding into said second part, and also serving as means for absorbing most of the optical energy emitted from said core into said extension which is thereafter internally reflected by said exit surface in directions so as to travel toward said absorbing means.

9. The combination defined in claim 8 and in which said exit surface is disposed at such an angle relative to the longitudinal axis of said core as to direct any optical energy travelling substantially parallel to said axis and being reflected by said exit surface toward a part of said light-absorbing means spaced from said end of said core.

10. A laser amplifier construction for use in providing a high gain to optical signals being transmitted therethrough, said construction comprising a relatively thin elongated member having an elongated core formed of a laser material having a predetermined refractive index and including an active laser ingredient therein, and a cladding of transparent material of a lesser refractive index diposed in surrounding contacting relation with side wall portions of said core, and an extension formed of a material of substantially the same refractive index as that of said core disposed adjacent an end of said member and integrally secured thereto in such a manner as to remove at least to a high degree the effects of any optical interface between said core and said extension, said extension being in the form of a transparent block of material of an appreciable dimension considered in the longitudinal direction thereof so as to allow optical energy which is travelling in directions other than substantially parallel to the longitudinal direction of said core to diverge upon being emitted from the end of said core and before impinging upon an end wall portion of said block, said block also being of such an appreciably greater transverse dimension than that of said core so as to allow most of such divergent optical energy which is internally reflected at the end wall of said block to spread out to an even greater amount before impinging upon other outer surface portions of said block whereby most of the energy internally reflected at said end surface will be prevented from reentering said core.

11. The combination defined in claim 10 and in which an opaque washer of suitable material is disposed between the end of said cladding and said end surface and serves to prevent most of the optical energy travelling in said cladding from reaching said end wall.

12. The combination defined in claim 10 and in which said end wall of said block is disposed at such an angle relative to the longitudinal direction of said core as to direct substantially all of the energy which is internally reflected at said end wall toward parts of said block spaced from said core.

13. The combination defined in claim 10 and including a heat sink in surrounding contacting relation with wall portions of said block spaced from said end wall.

No references cited.

JEWELL H. PEDERSEN, *Primary Examiner.*

RONALD L. WIBERT, *Assistant Examiner.*

U.S. Cl. X.R.

331—94.5